(12) United States Patent
Borwankar et al.

(10) Patent No.: US 9,243,970 B2
(45) Date of Patent: Jan. 26, 2016

(54) METHOD AND SYSTEM FOR INTEGRATING GAS TURBINE TRIM BALANCING SYSTEM INTO ELECTRONIC ENGINE CONTROLS

(71) Applicant: Pratt & Whitney Canada Corp., Longueuil (CA)

(72) Inventors: Paraag Borwankar, Oakville (CA); Heather Grant, Mississauga (CA); Enzo Macchia, Kleinburg (CA); Christopher McElvaine, St. Marc-sur-Richlieu (CA)

(73) Assignee: PRATT & WHITNEY CANADA CORP., Longueuil, CA (US)

( * ) Notice: Subject to any disclaimer, the term of this patent is extended or adjusted under 35 U.S.C. 154(b) by 327 days.

(21) Appl. No.: 13/689,855

(22) Filed: Nov. 30, 2012

(65) Prior Publication Data

US 2014/0150550 A1    Jun. 5, 2014

(51) Int. Cl.
*G01M 1/22* (2006.01)
*G01M 15/14* (2006.01)
*G01M 1/14* (2006.01)
*G01M 15/12* (2006.01)

(52) U.S. Cl.
CPC . *G01M 1/14* (2013.01); *G01M 1/22* (2013.01); *G01M 15/12* (2013.01); *G01M 15/14* (2013.01)

(58) Field of Classification Search
CPC ................. G01M 1/22; G01M 15/14
USPC ...................................... 73/455, 660
See application file for complete search history.

(56) References Cited

U.S. PATENT DOCUMENTS

| | | | |
|---|---|---|---|
| 4,488,240 A * | 12/1984 | Kapadia et al. | ............. 73/660 |
| 5,168,447 A | 12/1992 | Moore | |
| 6,459,963 B1 | 10/2002 | Bennett et al. | |
| 6,532,412 B2 | 3/2003 | Adibhatla et al. | |
| 6,990,432 B1 | 1/2006 | McCarthy, IV et al. | |
| 7,487,029 B2 | 2/2009 | Feeney et al. | |
| 7,957,851 B2 | 6/2011 | Braswell et al. | |
| 8,818,683 B2 * | 8/2014 | van Der Merwe et al. | ........... F01D 21/003 701/1 |

FOREIGN PATENT DOCUMENTS

EP    0050610    12/1986

* cited by examiner

*Primary Examiner* — John Chapman, Jr.
(74) *Attorney, Agent, or Firm* — Norton Rose Fulbright Canada LLP

(57) ABSTRACT

Methods and systems for determining a rebalancing strategy for trim balancing one or more rotational components of a gas turbine. One or more noise, acoustics or vibrational signals may be received at a control device of an aircraft comprising the gas turbine engine while the aircraft is in operation. The one or more noise, acoustics or vibrational signals may be used for determining a rebalancing strategy for one or more unbalanced rotational components.

17 Claims, 3 Drawing Sheets

METHOD AND SYSTEM FOR INTEGRATING GAS TURBINE TRIM BALANCING SYSTEM INTO ELECTRONIC ENGINE CONTROLS

TECHNICAL FIELD

The disclosure relates generally to gas turbine engines, and more particularly to integrating gas turbine trim balancing systems into electronic engine controls.

BACKGROUND OF THE ART

The rotational components of gas turbine engines may at times become unbalanced. This unbalancing may occur, for example, when foreign matter hits the rotational components, damaging or coating them. Rotational components may also become unbalanced during maintenance or repair procedures performed on the engine. When the rotational components become unbalanced, the result may be excess noise, acoustics and/or vibrations which may be uncomfortable and even unsettling to passengers and staff of the aircraft on which the engine is employed.

The rotational components of a gas turbine engine may have one or more weights attached in order to balance the component. When such a component needs to be re-balanced, weights may be moved, added and/or removed as necessary. The process of moving, adding and/or removing weights on rotational components of a gas turbine engine may be referred to as "trim balancing".

Conventionally, trim balancing is performed by ground maintenance crews using special trim balancing maintenance equipment that must be hooked to the engine to determine where weights can be positioned. This could be expensive, time consuming and/or inconvenient to the customer and/or mechanics. For example, it may require special maintenance equipment which may not be readily available, particularly in smaller or more remote airports. Moreover, since conventional trim balancing is done while the aircraft is on the ground (i.e., not during flight conditions), it may require several iterations to determine an optimal trim balance as conditions may be different during flight operations. Improvement in trim balancing procedures in gas turbine engines is desirable.

SUMMARY

In some example aspects, the disclosure describes electric machines, and in particular improved systems, devices, and processes for determining a rebalancing strategy for trim balancing one or more rotational components of a gas turbine.

In some example aspects, the present disclosure provides a method for determining a rebalancing strategy for trim balancing one or more rotational components of a gas turbine, the method may include: receiving one or more noise, acoustics or vibrational signals at a control device of an aircraft comprising the gas turbine engine while the aircraft is in operation; and using the one or more noise, acoustics or vibrational signals and one or more processors of the control device, determining a rebalancing strategy for one or more unbalanced rotational components.

In some example aspects, the present disclosure provides a control device of an aircraft comprising a gas turbine engine, the device useful for determining a rebalancing strategy for trim balancing one or more rotational components of the gas turbine engine, the device comprising: one or more receptors for receiving one or more noise, acoustics or vibrational signals from one or more sensors in the gas turbine engine while the aircraft is in operation; and one or more processors configured to determine a rebalancing strategy for one or more unbalanced rotational components.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION OF THE PREFERRED EMBODIMENTS

Various aspects of preferred embodiments are described through reference to the drawings.

Figure 1:
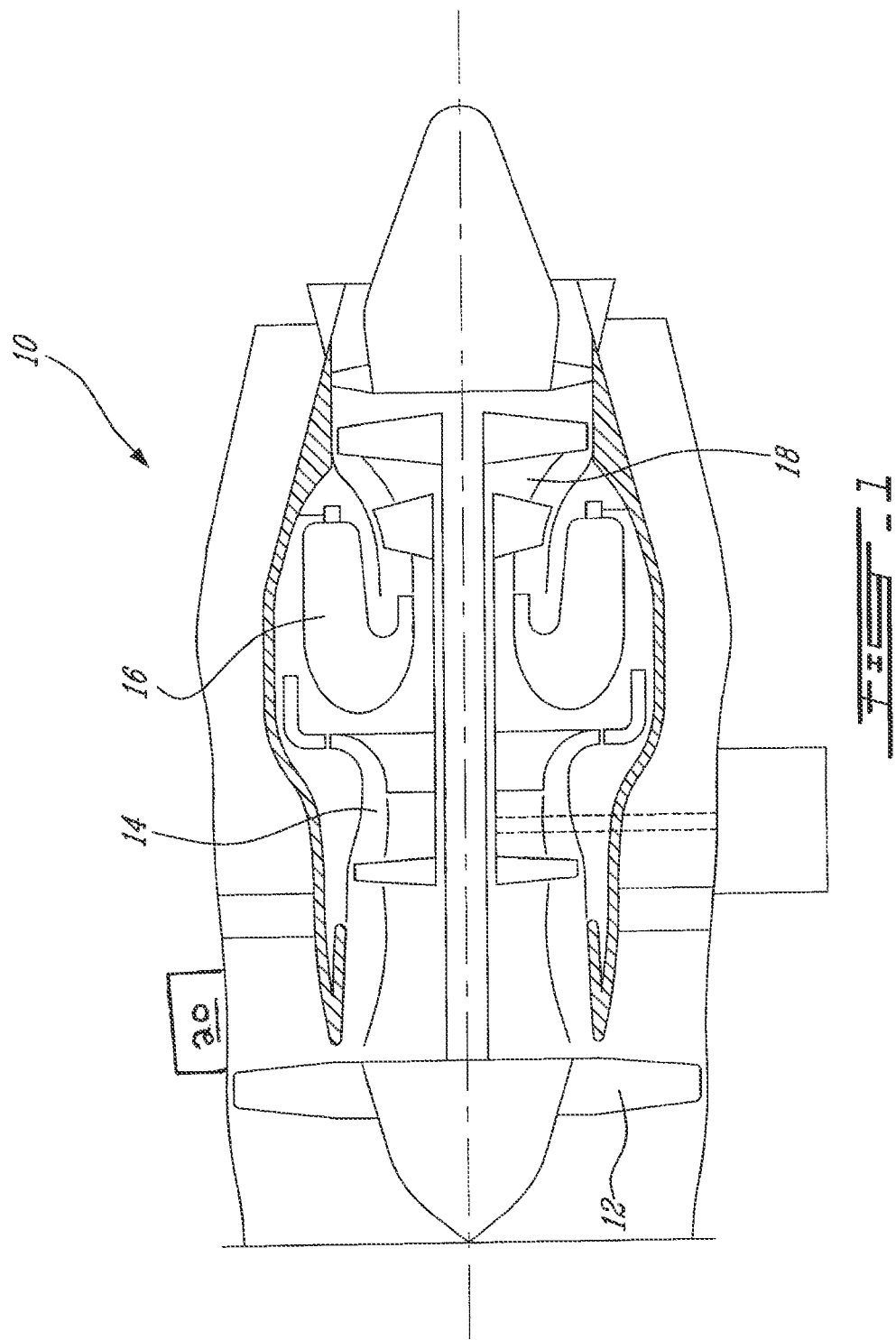
FIG. 1 shows an axial cross-section view of an example turbo-fan gas turbine engine.

FIG. 1 illustrates an example gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Gas turbine engine 10 may comprise a turbofan engine for use in an aircraft application. Engine 10 may comprise one or more control device(s) 20 which may automatically regulate at least some aspect(s) of the operation of engine 10 based on one or more input variable(s). Control device(s) 20 may, for example, be configured to receive multiple input variables representative of current flight conditions including, for example, air density, total temperature of inlet air, throttle lever position, engine temperatures, engine pressures, noise levels, acoustics levels, vibration levels and potentially many other parameters. Accordingly, control device(s) 20 may receive one or more signal(s) from one or more sensor(s) positioned throughout the engine 10 associated with various aspects of the operation of engine 10. Such signals may be received as input(s) by control device(s) 20 and analyzed by one or more automatic data processor(s) according to stored machine-readable instructions. Engine parameters such as fuel flow, stator vane position, bleed valve position, and others may be computed from this data and applied as appropriate by, for example, generating suitably-configured output signals and providing them to relevant device(s) associated with the engine 10. Control device(s) 20 may communicate with one or more sensors and/or ground equipment through wired and/or wireless connections, for example.

In various embodiments, control device(s) 20 may include or form part of a Full Authority Digital Engine Control (FADEC) which may, for example, comprise one or more digital computer(s) or other data processors, sometimes referred to as electronic engine controller(s) (EEC) and related accessories that control at least some aspects of performance of engine 10. Control device(s) 20 may for example be configured to make decisions regarding the control of engine 10 until a pilot wishes to or is required to intervene. Control device(s) 20 may be configured to provide optimum engine efficiency for a given flight condition. As data processors, control device(s) 20 may include one or more microcontroller or other suitably programmed or programmable logic circuits.

Figure 2:
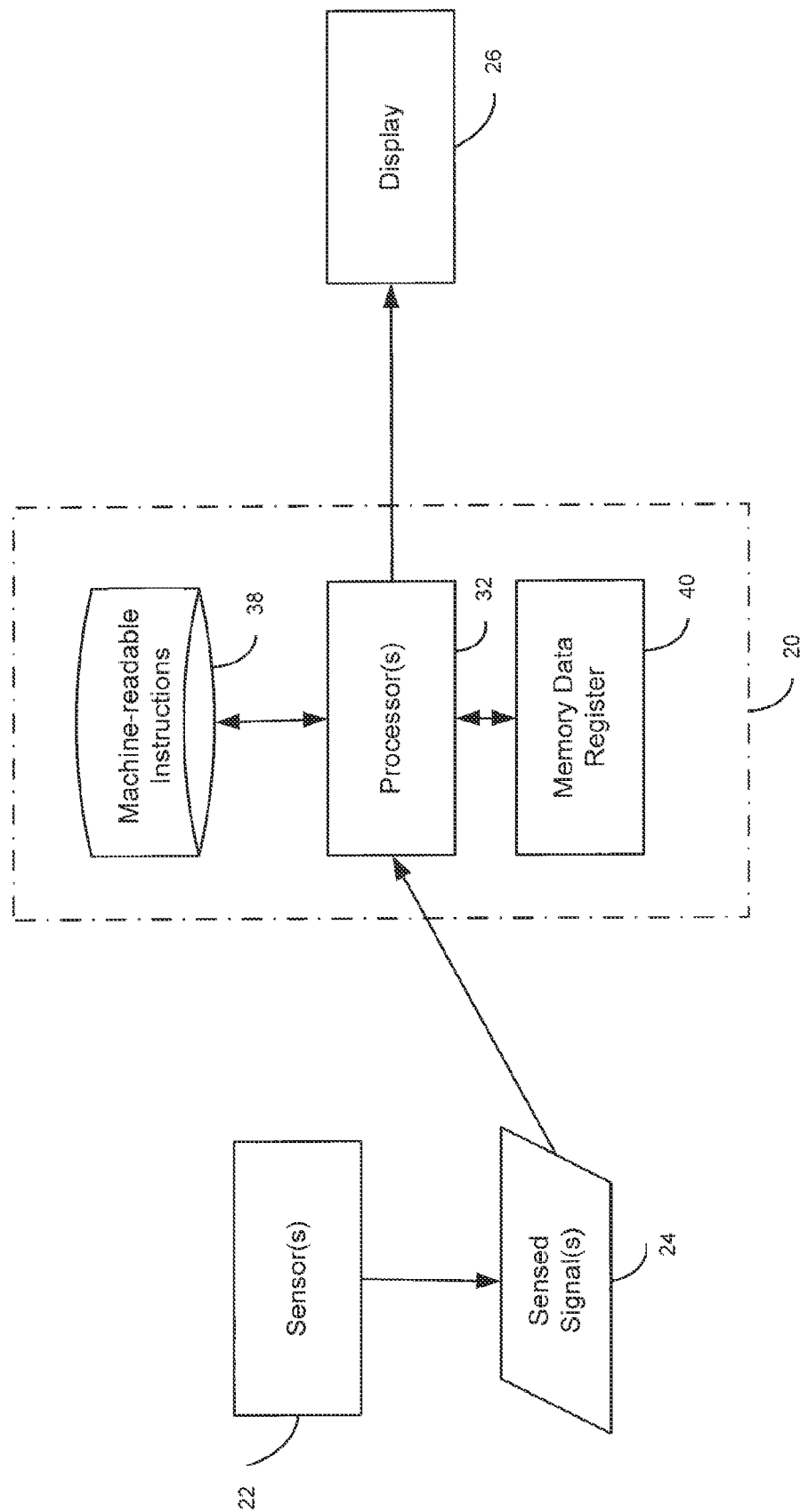
FIG. 2 shows a schematic diagram of an example engine trim balancing system in accordance with the disclosure.

FIG. 2 schematically illustrates an exemplary embodiment of control device(s) 20 configured to receive and analyze sensed signal(s) 24. Sensed signal(s) 24 may originate from sensor(s) 22 associated with one or more engines 10. Such sensor(s) 22 may be configured to provide signals representative of one or more measured property(ies) such as, for example, temperature(s), pressure(s), humidity, force(s), relative position(s), motion(s), noise, acoustics, vibration(s), chemical composition(s) and/or others to control device(s) 20. For example, such sensor(s) 22 may be configured to provide a signal representative of noise, acoustics and/or vibration levels of one or more rotational components of engine 10 to control device(s) 20. Such sensor(s) may, for example, include piezoelectric transducers or vibrational accelerometers including single axial and multi-axial vibration sensors, or other suitable noise or acoustic sensors. Those of skill in the art will recognize that there are numerous types of sensors (e.g., accelerometers or suitable sensors) which may be employed to measure the vibration or noise (or other such signals) of rotational components of an engine and the present disclosure is not meant to be limited to any particular type of sensor.

Control device(s) 20 may also comprise memory(ies) 38 and memory data devices or register(s) 40. Memory(ies) 38 may comprise any data storage devices suitable for storing data received and/or generated by processor(s) 32, preferably retrievably. For example, memory(ies) 38 may comprise one or more of any or all of erasable programmable read only memory(ies) (EPROM), flash memory(ies) or other electromagnetic media suitable for storing electronic data signals in volatile or non-volatile, non-transient form. Memory(ies) 38 may contain machine-readable instructions for execution by processor(s) 32.

Processor(s) 32 may also be configured to determine a rebalancing strategy for rebalancing one or more rotational components of engine 10 such as fan 12, or any other rotational components. As mentioned above, rotational components of engine 10 may have one or more weights attached in order to ensure the rotational component is balanced. Due to, for example, foreign matter hitting the component, maintenance procedures or other occurrences, at times, a rotational component may become unbalanced, possibly causing excess noise, acoustics and/or vibrations. When an imbalance occurs in a rotational component, weights attached to such component may need to be moved, added and/or removed. The determination of how such weights should be moved, added and/or removed may be referred to as a rebalancing strategy. The rebalancing strategy may be sent, for example as electronic signals, to display 26 through any suitable wireless or wired means, which may be local or remote. Display 26 may, for example, comprise the display of a portable device such as a smart phone, cellular telephone, laptop computer, portable media, tablet device, or any other suitable computing device. Alternatively, display 26 may be a display associated with an aircraft or ground based machinery.

Figure 3:
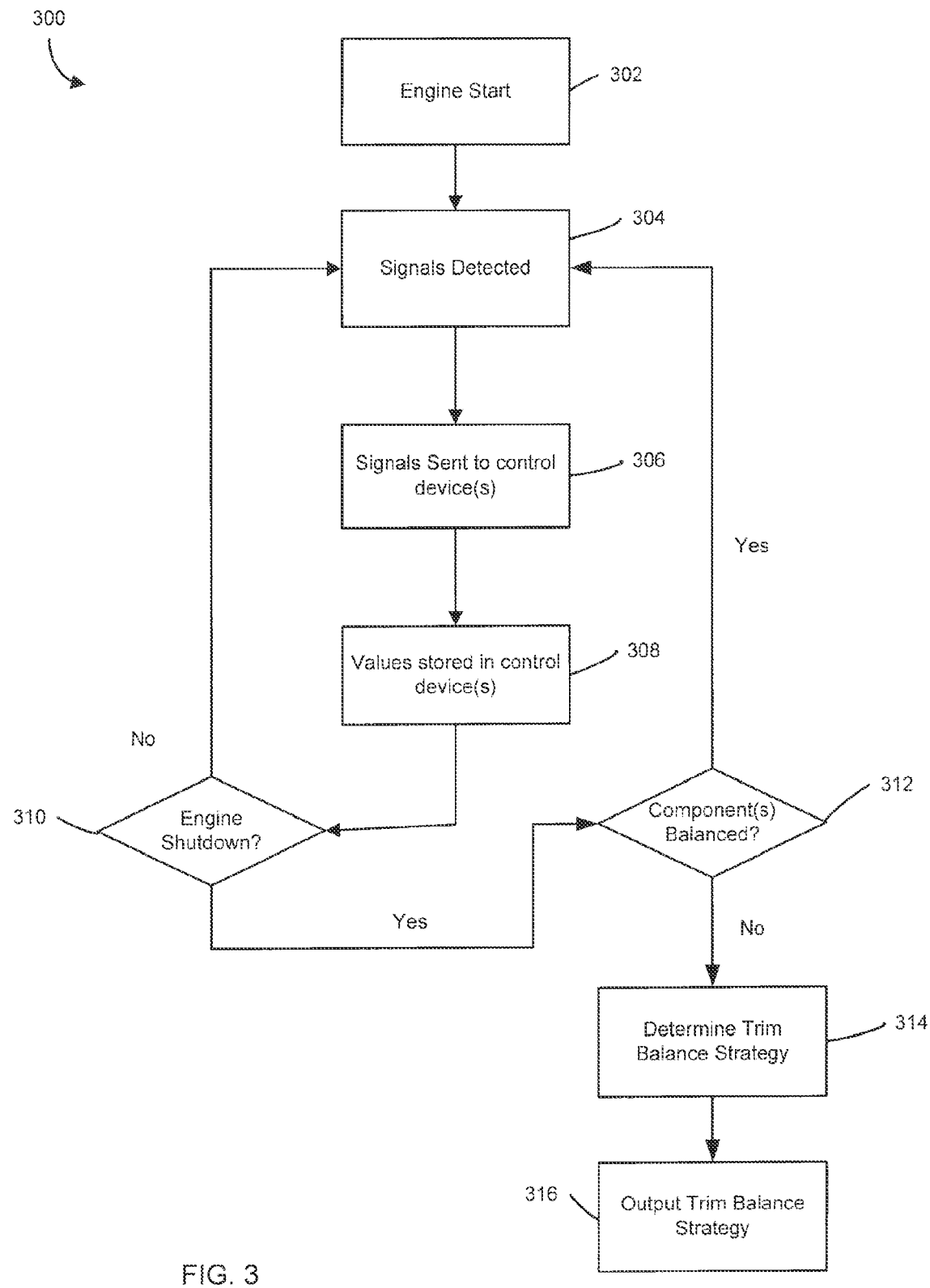
FIG. 3 shows a flow chart illustrating an example of a method for determining a rebalancing strategy in accordance with the disclosure.

FIG. 3 schematically illustrates an exemplary method which may be used to determine a rebalancing strategy for one or more rotational components of engine 10. Reference will be made to the elements of FIGS. 1 and 2.

Method 300 begins at 302 where engine 10 is started. At 304, sensor(s) 22 may sense one or more signals, such as noise, acoustics and/or vibrational signals indicative of noise, acoustics and/or vibration levels associated with one or more rotational components of engine 10. Additionally or alternatively, other signals, which may represent other sensor signals, such as signals from noise sensors or acoustic sensors, may be sensed. At 306 control device(s) 20 associated with engine 10 may receive sensed signal(s) 24 from sensor(s) 22 such as the noise and/or vibrational signals indicative of noise, acoustics and/or vibration levels associated with one or more rotational components of engine 10. At 308, the sensed signal(s) 24 may be stored in one or more memory device(s) 38, 40 of control device(s) 20.

The signal levels (e.g., noise, acoustics and/or vibration levels) detected by sensor(s) 22 may be continuously or periodically monitored and stored while engine 10 is in operation. At 310, it is determined whether there has been an engine shutdown. If the engine has not shut down (e.g. is still in operation), method 300 returns to 304 to continue monitoring and storing signal levels of rotational components of engine 10. If the engine has shut down, method 300 may proceed to 312. Method 300 may be carried out when engine 10 is shut down, and may determine when engine 10 is started again. Method 300 may also be carried out when engine 10 is running.

At 312, processor(s) 32 of control device(s) 20 may use data collected including sensed signal(s) 24 to determine whether the rotational components of engine 10 are all balanced. For example, if the signal(s) 24 indicate noise, acoustics and/or vibration of one or more components exceeding a preset threshold (e.g., a noise, acoustics and/or vibration threshold), it may be determined that rebalancing is required. For example, processor(s) 32 may perform a comparison between the values of the sensed signal(s) 24 and a pre-set threshold (e.g., stored on control device(s) 20) in order to determine whether rebalancing is required. If the threshold is exceeded, it may be determined that rebalancing is required. In some examples, processor(s) 32 may additionally or alternatively compare the values of the sensed signal(s) 24 with a previous instance of the sensed signal(s) 24 (e.g., stored from a previous time period) in order to determine a trend (such as a sudden change or sudden movement, which may indicate a need for rebalancing) in the values, in order to determine whether rebalancing is required. If the components are all balanced (e.g., the signal(s) 24 indicate that noise, acoustics and/or vibrations, are below a preset threshold), method 300 may return to 304 to continue monitoring noise, acoustics and/or vibration levels. In some examples, even where all components are determined to be balanced, method 300 may nonetheless continue to 314 to determine a rebalancing strategy.

If one or more of the components are not balanced, at 314, processor(s) 32 of control device(s) 20 may determine a rebalancing strategy using the information regarding noise and/or vibrational levels detected by sensor(s) 22 and stored in memor(ies) 38,40 of control device(s) 20. For example, the control device(s) 20 may determine a strategy to reduce noise, acoustics and/or vibration by assessing the current weight distribution and using a suitable predefined mathematical relationship that may be specific to the engine 10 of interest.

In some embodiments, processor(s) may determine a rebalancing strategy continuously, periodically or only when such a strategy is requested by, for example, a pilot, maintenance crew or other staff member. For example, the rebalancing strategy may be continuously or near-continuously determined and this strategy may be provided to the user in response to a user request.

A determination that trim balancing of one or more rotational components may be necessary may be made by a pilot, a member of a maintenance crew or other staff member. A pilot or other staff member may be alerted to the imbalance of one or more rotational components of one or more of the engines 10 on an aircraft through, for example, indications of excess noise, acoustics and/or vibrations in the aircraft instrumentation, through his/her own experience in the aircraft and/or from passenger or staff complaints regarding excess noise, acoustics and/or vibrations in the aircraft. The pilot or other staff member may input a user request to the processor(s) to generate a rebalancing strategy accordingly.

At 312, a rebalancing strategy determined at 310 may be outputted to a user, for example the strategy may be sent, through any wireless or wired means, to display 26. In some embodiments, the rebalancing strategy may be sent to display 26 continuously, periodically or only when such a strategy is requested. The rebalancing strategy may additionally or alternatively stored and/or transmitted to another system for future use. The rebalancing strategy may be used, for example, by maintenance staff, to rebalance the one or more rotational components of engine 10. For example, the rebalancing strategy may include a recommendation of a new size and/or location of one or more balance weights, to reduce noise, acoustics and/or vibration.

In some examples, in addition to or in place of a recommendation for rebalancing balance weights, the rebalancing strategy may include a recommendation for relocating and/or repositioning one or more engine rotor airfoils (i.e., fan blades). In some examples, additionally or alternatively, the rebalancing strategy may include a recommendation of how one or more engine rotor airfoils can have material removed.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A method for determining a rebalancing strategy for trim balancing one or more rotational components of a gas turbine engine of an aircraft using an electronic engine controller of the gas turbine engine, the method comprising:
    receiving one or more noise, acoustics or vibrational signals at the electronic engine controller of the gas turbine engine while the aircraft is in operation;
    using the electronic engine controller to analyze the one or more noise, acoustics or vibrational signals and regulate at least one aspect of the operation of the gas turbine engine based on the one or more noise, acoustics or vibrational signals; and
    using the one or more noise, acoustics or vibrational signals and one or more processors of the electronic engine controller, determining a rebalancing strategy for one or more unbalanced rotational components.

2. The method of claim 1, the method further comprising determining whether at least one of the one or more rotational components is unbalanced and determining the rebalancing strategy only if at least one of the one or more rotational components is unbalanced.

3. The method of claim 2, wherein determining whether at least one of the one or more rotational components is unbalanced comprises determining whether at least one of the one or more noise, acoustics or vibrational signals exceeds a preset noise, acoustics or vibration threshold.

4. The method of claim 1, wherein the rebalancing strategy comprises a determination of how one or more weights attached to the one or more rotational components can be moved, added or removed, in order to rebalance the one or more rotational components.

5. The method of claim 1, wherein the rebalancing strategy comprises a determination of how one or more engine rotor airfoils can be relocated or repositioned, in order to rebalance the one or more rotational components.

6. The method of claim 1, wherein the rebalancing strategy comprises a determination of how one or more engine rotor airfoils can have material removed, in order to rebalance the one or more rotational components.

7. The method of claim 1, wherein the one or more noise, acoustics or vibrational signals are detected using one or more sensors coupled to the gas turbine engine.

8. The method of claim 1, wherein data representing the one or more vibrational signals are stored in at least one memory of the electronic engine controller.

9. An electronic engine controller of a gas turbine engine of an aircraft, the electronic engine controller useful for controlling at least some aspect of operation of the gas turbine engine and determining a rebalancing strategy for trim balancing one or more rotational components of the gas turbine engine, the electronic engine controller comprising:
    one or more receptors for receiving one or more noise, acoustics or vibrational signals from one or more sensors in the gas turbine engine while the aircraft is in operation; and
    one or more processors configured to:
        analyze the one or more noise, acoustics or vibrational signals and regulate at least one aspect of the operation of the gas turbine engine based on the one or more noise, acoustics or vibrational signals; and
        determine a rebalancing strategy for one or more unbalanced rotational components based on the one or more noise, acoustics or vibrational signals.

10. The electronic engine controller of claim 9, wherein the one or more processors are further configured to determine whether at least one of the one or more rotational components is unbalanced and determine the rebalancing strategy only if at least one of the one or more rotational components is unbalanced.

11. The electronic engine controller of claim 10, wherein the one or more processors are further configured to determine whether at least one of the one or more rotational components is unbalanced by determining whether at least one of the one or more noise, acoustics or vibrational signals exceeds a preset noise, acoustics or vibrational threshold.

12. The electronic engine controller of claim 9, wherein the rebalancing strategy comprises a determination of how one or more weights attached to the one or more rotational components can be moved, added or removed in order to rebalance the one or more rotational components.

13. The electronic engine controller of claim 9, wherein the rebalancing strategy comprises a determination of how one or more engine rotor airfoils can be relocated or repositioned, in order to rebalance the one or more rotational components.

14. The electronic engine controller of claim 9, wherein the rebalancing strategy comprises a determination of how one or more engine rotor airfoils can have material removed, in order to rebalance the one or more rotational components.

15. The electronic engine controller of claim 9, wherein the one or more noise, acoustics or vibrational signals are detected using one or more sensors attached to the gas turbine engine.

16. The electronic engine controller of claim 9, the electronic engine controller further comprising at least one memory for storing data representing the one or more noise, acoustics or vibrational signals.

17. An aircraft comprising the electronic engine controller of claim 9.

\* \* \* \* \*